United States Patent [19]
Goetz et al.

[11] Patent Number: 5,332,777
[45] Date of Patent: Jul. 26, 1994

[54] UNREINFORCED POLYAMIDE MOLDING MATERIALS

[75] Inventors: Walter Goetz; Walter Betz, both of Ludwigshafen, Fed. Rep. of Germany

[73] Assignee: BASF Aktiengesellschaft, Ludwigshafen, Fed. Rep. of Germany

[21] Appl. No.: 950,496

[22] Filed: Sep. 25, 1992

[30] Foreign Application Priority Data

Sep. 26, 1991 [DE] Fed. Rep. of Germany ....... 4131986

[51] Int. Cl.$^5$ ............................................. C08K 3/10
[52] U.S. Cl. ................................. 524/437; 524/599; 524/600; 524/601; 524/604; 524/606; 524/773; 524/786; 524/879; 525/183; 525/184; 525/190; 525/425; 525/426; 525/432; 525/928
[58] Field of Search ............... 524/786, 600, 437, 599, 524/601, 604, 606, 773, 879; 525/190, 540, 928, 183, 184, 425, 426, 432

[56] References Cited

U.S. PATENT DOCUMENTS

| | | | |
|---|---|---|---|
| 4,148,846 | 4/1979 | Owens et al. | 525/66 |
| 4,791,027 | 12/1988 | Reimann et al. | 524/425 |
| 5,026,787 | 6/1991 | Takagi et al. | 525/905 |

FOREIGN PATENT DOCUMENTS

| | | |
|---|---|---|
| 0280221 | 8/1988 | European Pat. Off. . |
| 59204632 | of 0000 | Japan . |
| WO88/02763 | 4/1988 | PCT Int'l Appl. . |
| 2083686 | of 0000 | United Kingdom . |

*Primary Examiner*—John Kight, III
*Assistant Examiner*—John M. Cooney, Jr.
*Attorney, Agent, or Firm*—Keil & Weinkauf

[57] ABSTRACT

Unreinforced polyamide molding materials contain
  A) from 60 to 100% by weight of a mixture consisting of
    $A_1$) from 97.5 to 99.85% by weight of one or more polyamides,
    $A_2$) from 0.05 to 0.5% by weight of aluminum hydroxide and
    $A_3$) from 0.1 to 2% by weight of one or more esters or amides of saturated or unsaturated aliphatic carboxylic acids of 10 to 40 carbon atoms with aliphatic saturated alcohols or amines of 2 to 40 carbon atoms
  and, based on the total weight of the polyamide molding material,
  B) from 0 to 40% by weight of a toughened polymer and
  C) from 0 to 10% by weight of conventional additives in effective amounts.

7 Claims, No Drawings

UNREINFORCED POLYAMIDE MOLDING MATERIALS

The present invention relates to unreinforced polyamide molding materials, containing A) from 60 to 100% by weight of a mixture consisting of
- $A_1$) from 97.5 to 99.85% by weight of one or more polyamides,
- $A_2$) from 0.05 to 0.5% by weight of aluminum hydroxide and
- $A_3$) from 0.1 to 2% by weight of one or more esters or amides of saturated or unsaturated aliphatic carboxylic acids of 10 to 40 carbon atoms with aliphatic saturated alcohols or amines of 2 to 40 carbon atoms and, based on the total weight of the polyamide molding material, B) from 0 to 40% by weight of a toughened polymer and C) from 0 to 10% by weight of conventional additives in effective amounts.

The present invention furthermore relates to the use of such molding materials for the production of fibers, films and moldings, and to the moldings obtainable from the novel molding materials.

Polypides are used in many areas, for example in the automotive sector, for the production of housings for electrical appliances or in the building sector.

Trouble-free processing to many differently shaped articles plays an important role here.

For improved processing, lubricants are therefore generally added to polyamides. These may be added during processing in the extruder during compounding or applied subsequently.

By adding lubricants, it is intended to ensure better flow of the polyamide melt (better gliding along the walls in the injection molding machine so that a lower pressure is sufficient for filling the injection mold) and easier removal of the injection molding from the mold (i.e. less adhesion to the mold and hence shorter cycle times).

EP-A 280 221 discloses that lubricants can be applied subsequently to polyamide granules (i.e. external lubrication). These lubricants consist of a combination of metal salts and esters of fatty acids, in particular stearic acid.

DE-A 2 349 835 discloses filler-containing polyamide molding materials which contain metal salts of long-chain carboxylic acids as lubricants, these being incorporated during compounding (i.e. internal lubrication).

As polishers without such additives, polyamides are flame-retardant, i.e. in the fire test according to UL-94, classification V-2 with a maximum subsequent combustion time of 10 seconds is achieved. By adding lubricants, the maximum subsequent combustion time of 30 seconds per bar after flame application is exceeded (equivalent to a UL-94 classification of HB). Polyamides treated with aluminum stearate (cf. DE-A 2 349 835) achieve classification V-2 but there is a decrease in the molecular weight of the polyamide during processing and hence a loss of toughness. Accordingly, this application is not suitable in the case of high molecular weight polyamides.

Lubricants such as polytetrafluoroethylene, molybdenum sulfide or graphite (cf. GB-A 1 082 686) have disadvantages, such as high costs, toxicity or too dark a natural color.

EP-A 331 001 discloses the addition of polyether esters to polyamide molding materials for improving the flow. Fire class V-2 according to UL-94 is not achieved by these molding materials.

European Patent 413,258 discloses the addition of polyether esters with aluminum salts or alumina. In addition to a decrease in the molecular weight due to the aluminum salts, polyether esters lead to a decrease in the UV stability of the polyamides. In addition, these additives are very expensive. DE-A 40 39 420 proposes a process for the preparation of readily flowing polyamide molding materials; polyether esters being subjected to postcondensation with polyamide prepolymers in the solid phase.

It is an object of the present invention to provide unreinforced polyamide molding materials which achieve classification V-2 according to UL-94 and have good flow and UV stability. It was also intended to ensure the preparation of such molding materials by various methods.

We have found that this object is achieved by the molding materials defined at the outset. Preferred molding materials of this type and the use thereof are described in the subclaims.

The novel molding materials contain, as component A, from 60 to 100, preferably from 80 to 100, in particular from 80 to 90, % by weight of a mixture consisting of

- $A_1$) from 97.5 to 99.85% by weight of one or more polyamides,
- $A_2$) from 0.05 to 0.5% by weight of alumina and
- $A_3$) from 0.1 to 2% by weight of one or more esters or amides of saturated or unsaturated aliphatic carboxylic acids of 10 to 40 carbon atoms with aliphatic saturated alcohols or amines of 2 to 40 carbon atoms.

The novel molding materials contain, as component $A_1$) from 97.5 to 99.85, preferably from 98.1 to 99.6, in particular from 98.8 to 99.4, % by weight of a thermoplastic polyamide.

The polyamides of the novel molding materials generally have a viscosity number VN of from 100 to ml/g, determined in a 0.5% strength by weight solution in 96% strength by weight sulfuric acid at 25° C. Polyamides having a viscosity number of from 120 to 250, in particular from 135 to 180, ml/g are preferably used.

Semicrystalline or amorphous resins having a Weight average molecular weight of not less than 5,000, as described in, for example, U.S. Pat. Nos. 2,071,250, 2,071,251, 2,130,523, 2,130,948, 2,241,322, 2,312,966, 2,512,606 and 3,393,210, are preferred.

Examples of these are polyamides which are derived from lactams having 7 to 13 ring members, such as polycaprolactam, polycapryllactam and polylaurolactam, as well as polyamides which are obtained by reacting dicarboxylic acids with diamines.

Suitable dicarboxylic acids are alkanedicarboxylic acids of 6 to 12, in particular 6 to 10, carbon atoms and aromatic dicarboxylic acids. Only adipic acid, azelaic acid, sebacic acid, dodecanedioic acid and terephthalic and/or isophthalic acid are mentioned here as acids.

Particularly suitable diamines are alkanediamines of 6 to 12, in particular 6 to 8, carbon atoms and m-xylylenediamine, di-(4-aminophenyl)-methane, di-(4-aminocyclohexyl)-methane, 2,2-di-(4-aminophenyl)-propane or 2,2-di-(4-aminocyclohexyl)-propane.

Preferred polyamides are polyhexamethyleneadipamide, polyhexamethylenesebacamide and polycaprolactam.

Other examples are polyamides which are obtainable, for example, by condensation of 1,4-diaminobutane with adipic acid at elevated temperature (nylon 4,6). Preparation processes for polyamides having this structure are described in, for example, EP-A 38 094, EP-A 38 582 and EP-A 39 524.

Polyamides which are obtainable by copolymerization of two or more of the abovementioned monomers, or blends of a plurality of polyamides, are also suitable, and any mixing ratio may be used.

Other suitable components $A_1$) are partly aromatic, semicrystalline copolyamides composed of:

$A_{11}$) from 20 to 90% by weight of units derived from terephthalic acid and hexamethylenediamine, $A_{22}$) from 0 to 50% by weight of units derived from ε-caprolactam, $A_{33}$) from 0 to 80% by weight of units derived from adipic acid and hexamethylenediamine, and $A_{44}$) from 0 to 40% by weight of other polyamide-forming monomers, the amounts of components ($A_{22}$) or ($A_{33}$) or ($A_{44}$) or mixtures thereof being not less than 10% by weight.

Component $A_{11}$) contains from 20 to 90% by weight of units derived from terephthalic acid and hexamethylenediamine.

In addition to the units derived from terephthalic acid and hexamethylenediamine, the copolyamides contain units derived from ε-caprolactam and/or units derived from adipic acid and hexamethylenediamine and/or units derived from further polyamide-forming monomers.

The amount of units derived from ε-caprolactam is not more than 50, preferably from 20 to 50, in particular from 25 to 40, % by weight, while the amount of units derived from adipic acid and hexamethylenediamine is up to 80, preferably from 30 to 75, in particular from 35 to 60, % by weight.

The copolyamides may also contain both units of ε-caprolactam and units of adipic acid and hexamethylenediamine; in this case, it is advantageous if the amount of units which are free of aromatic groups is not less than 10, preferably not less than 20, % by weight. The ratio of the units derived from ε-caprolactam to those derived from adipic acid and hexamethylenediamine is not subject to any particular restriction.

Polyamides having from 50 to 80, in particular from 60 to 75, % by weight of units derived from terephthalic acid and hexamethylenediamine (units $A_{11}$) and from 20 to 50, preferably from 25 to 40, % by weight of units derived from ε-caprolactam (units $A_{22}$)) have proven particularly advantageous for many intended uses.

In addition to the units $A_{11}$) to $A_{33}$) described above, the partly aromatic copolyamides may contain up to 40, preferably from 10 to 30, in particular from 20 to 30, % by weight of further polyamide-forming monomers $A_{44}$), as known for other polyamides.

Aromatic dicarboxylic acids $A_{44}$) have 8 to 16 carbon atoms. Examples of suitable aromatic dicarboxylic acids are isophthalic acid, substituted terephthalic and isophthalic acids, such as 3-tert-butylisophthalic acid, polynuclear dicarboxylic acids, e.g. 4,4'- and 3,3'-diphenyldicarboxylic acid, 4,4'- and 3,3'-diphenylmethanedicarboxylic acid, 4,4'- and 3,3'-diphenylsulfonedicarboxylic acid, 1,4- or 2,6-naphthalenedicarboxylic acid and phenoxyterephthalic acid, isophthalic acid being particularly preferred.

Further polyamide-forming monomers $A_{44}$) may be derived from dicarboxylic acids of 4 to 16 carbon atoms and aliphatic or cycloaliphatic diamines of 4 to 16 carbon atoms and from aminocarboxylic acids or corresponding lactams of 7 to 12 carbon atoms. Among suitable monomers of these types, only suberic acid, azelaic acid and sebacic acid are mentioned here as typical members of the aliphatic dicarboxylic acids, 1,4-butanediamine, 1,5-pentanediamine, piperazine, 4,4'-diaminodicyclohexylmethane, 2,2-(4,4'-diaminodicyclohexyl)propane and 3,3'-dimethyl-4,4'-diaminodicyclohexylmethane as typical members of the diamines and capryllactam, enantholactam, ω-aminoundecanoic acid and laurolactam as typical members of the lactams and aminocarboxylic acids.

The following compositions of component ($A_1$) are particularly preferred:

$A_{11}$) from 65 to 85% by weight of units derived from terephthalic acid and hexamethylenediamine and $A_{44}$) from 15 to 35% by weight of units derived from isophthalic acid and hexamethylenediamine, or $A_{11}$) from 50 to 70% by weight of units derived from terephthalic acid and hexamethylenediamine, $A_{33}$) from 10 to 20% by weight of units derived from adipic acid and hexamethylenediamine and $A_{44}$) from 20 to 30% by weight of units derived from isophthalic acid and hexamethylenediamine.

If component ($A_{44}$) contains symmetric dicarboxylic acids in which the carboxyl groups are in the para position, it is advisable to convert it into ternary copolyamides with ($A_{11}$) and ($A_{22}$) or ($A_{11}$) and ($A_{33}$), since otherwise the copolyamide has too high a melting point and melts only with decomposition, which is undesirable.

Furthermore, partly aromatic copolyamides whose triamine content is less than 0.5, preferably less than 0.3, % by weight have proven particularly advantageous.

Partly aromatic copolyamides prepared by most known processes (cf. U.S. Pat. No. 4,603,166) have triamine contents of more than 0.5% by weight, which leads to a deterioration in the product quality and to problems in continuous preparation. The triamine which causes these problems is in particular dihexamethylenetriamine, which is formed from the hexamethylenediamine used in the preparation.

With the same solution viscosity, copolyamides having a low triamine content exhibit lower melt viscosities compared with products of the same composition which have a higher triamine content. This considerably improves both the processability and the product properties.

The melting points of the partly aromatic copolyamides are from 270° to 325° C., preferably from 280° to 310° C., this high melting point also being associated with a high glass transition temperature of, as a rule, more than 75° C., in particular more than 85° C. (in the dry state).

Binary copolyamides based on terephthalic acid, hexamethylenediamine and ε-caprolactam have melting points of about 300° C. and (in the dry state) a glass transition temperature of more than 110° C. when they contain about 70% by weight of units derived from terephthalic acid and hexamethylenediamine.

Binary copolyamides based on terephthalic acid, adipic acid and hexamethylenediamine achieve melting points of 300° C. or more even with low contents of about 55% by weight of units derived from terephthalic acid and hexamethylenediamine (HMD), the glass transition temperature not being quite as high as in the case of binary copolyamides which contain ε-caprolactam instead of adipic acid or adipic acid/HMD.

According to the invention, the partly aromatic copolyamides are to be understood as meaning those which have a crystallinity of >10%, preferably >15%, in particular >20%.

The crystallinity is a measure of the proportion of crystalline fragments in the copolyamide and is determined by X-ray diffraction.

The preparation of the preferred partly aromatic copolyamides having a low triamine content can be carried out by the processes described in EP-A 129 195 and 129 196.

The novel molding materials contain, as component $A_2$), from 0.05 to 0.5, preferably from 0.1 to 0.4, in particular from 0.1 to 0.2, % by weight of aluminum hydroxide.

There are a plurality of hydrated forms of alumina which correspond to the general formulae AlO.OH and Al(OH)$_3$, those of the latter formula being preferred.

The addition of ammonia to an aluminum salt solution gives a form of AlO.OH which is referred to as boehmite. A second form occurs in nature as the mineral diaspore. Al(OH)$_3$ is generally prepared from alkaline aluminate solutions by precipitation with carbon dioxide. Such hydroxides are commercially available as, inter alia, Martinal ®.

The mean particle size is in general from 0.5 to 4 μm, preferably from 0.8 to 3 μm.

The novel molding materials contain, as component $A_3$), from 0.1 to 2, preferably from 0.3 to 1.5, in particular from 0.5 to 1, % by weight of one or more esters or amides of saturated or unsaturated aliphatic carboxylic acids of 10 to 40, preferably 16 to 22, carbon atoms with aliphatic saturated alcohols or amines of 2 to 40, preferably 2 to 6, carbon atoms.

The carboxylic acids may be monobasic or dibasic. Examples are pelargonic acid, palmitic acid, lauric acid, margaric acid, dodecanedioic acid, behenic acid and particularly preferably stearic acid and montanic acid (mixtures of fatty acids of 30 to 40 carbon atoms).

The aliphatic alcohols may be monohydric to tetrahydric. Examples of alcohols are n-butanol, n-octanol, stearyl alcohol, ethylene glycol, propylene glycol, neopentyl glycol and glycerol, pentaerythritol being preferred.

The aliphatic amines may be monofunctional to trifunctional. Examples of these are stearylamine, ethylenediamine, propylenediamine, hexamethylenediamine and di-(6-aminohexyl)-amine, ethylenediamine and hexamethylenediamine being particularly preferred. Preferred esters or amides are accordingly pentaerythrityl distearate and ethylenediamine distearate.

Mixtures of different esters or amides or esters in combination with amides may also be used, and any mixing ratio is possible.

The novel molding materials may contain, as component B), from 0 to 40, preferably from 5 to 25, in particular from 10 to 20, % by weight of an elastomeric polymer.

Preferred elastomeric polymers are polymers based on olefins which are composed of the following components:

$b_1$) from 40 to 100% by weight of one or more α-olefins of 2 to 8 carbon atoms $b_2$) from 0 to 50% by weight of a diene $b_3$) from 0 to 45% by weight of a $C_1$–$C_{12}$-alkyl ester of acrylic acid or methacrylic acid or mixtures of such esters $b_4$) from 0 to 40% by weight of an ethylenically unsaturated mono- or dicarboxylic acid or a functional derivative of such an acid $b_5$) from 0 to 40% by weight of a monomer containing epoxy groups, with the proviso that component (B) is not an olefin homopolymer.

The first preferred group comprises the ethylene/propylene (EPM) and ethylene/propylene/diene (EPDM) rubbers, which preferably have a ratio of ethylene to propylene units of from 40:60 to 90:10.

The Mooney viscosities (MLI+4/100° C.) of such, preferably uncrosslinked, EPM or EPDM rubbers (gel contents generally less than 1% by weight) are preferably from 25 to 100, in particular from 35 to 90 (measured using the large rotor after a running time of 4 minutes at 100° C. according to DIN 53,523).

EPM rubbers generally have virtually no double bonds whereas EPDM rubbers can have from 1 to 20 double bonds per 100 carbon atoms.

Examples of diene monomers $b_2$) for EPDM rubbers are conjugated dienes, such as isoprene and butadiene, nonconjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene or 2-isopropenyl-5-norbornene, and tricyclodienes, such as 3-methyltricyclo[5.2.1.0.2.6]-3,8-decadiene, or mixtures thereof. Hexa-1,5-diene, 5-ethylidenenorbornene and dicyclopentadiene are preferred. The diene content of the EPDM rubbers is preferably from 0.5 to 50, in particular from 2 to 20, particularly preferably from 3 to 15, % by weight, based on the total weight of the olefin polymer.

EPM and EPDM rubbers can preferably also be grafted to reactive carboxylic acids or derivatives thereof. Acrylic acid, methacrylic acid and derivatives thereof and maleic anhydride may be mentioned in particular here.

A further group of preferred olefin polymers comprises copolymers of α-olefins of 2 to 8 carbon atoms, in particular of ethylene, with $C_1$–$C_{18}$-alkyl esters of acrylic acid and/or methacrylic acid.

All primary and secondary $C_1$–$C_{18}$-alkyl esters of acrylic acid or methacrylic acid are in principle suitable, but esters of 1 to 12, in particular 2 to 10, carbon atoms are preferred.

Examples of these are methyl, ethyl, propyl, n-butyl, isobutyl, 2-ethylhexyl, octyl and decyl acrylates and the corresponding esters of methacrylic acid. Among these, n-butyl acrylate and 2-ethylhexyl acrylate are particularly preferred.

The amount of the methacrylates and acrylates $b_3$) in the olefin polymers is from 0 to 60, preferably from 10 to 50, in particular from 30 to 45, % by weight.

Instead of the esters ba), or in addition to them, the olefin polymers may also contain acid-functional and/or latent acid-functional monomers of ethylenically unsaturated mono- or dicarboxylic acids b4) or monomers b5) having epoxy groups.

The acid-functional or latent acid-functional monomers and the monomers containing epoxy groups are preferably incorporated in the olefin polymers by adding compounds of the general formulae I–IV to the monomer mixture.

$$R_1C(COOR_2)=C(COOR_3)R_4 \qquad (I)$$

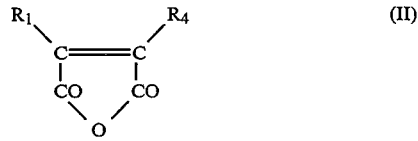
(II)

$$CHR^7=CH-(CH_2)_m-O-(CHR^6)-CH\underset{O}{\overset{}{\diagdown\!\!\diagup}}CHR^5 \qquad (III)$$

$$CH_2=CR^9-COO-(CH_2)_n-CH\underset{O}{\overset{}{\diagdown\!\!\diagup}}CHR^8 \qquad (IV)$$

where $R_1$ to $R_9$ are each hydrogen or alkyl of 1 to 6 carbon atoms, m is an integer of from 0 to 20 and n is an integer of from 0 to 10.

$R_1$ to $R_7$ are each preferably hydrogen, m is preferably 0 or 1 and n is preferably 1. The corresponding compounds are maleic acid, fumaric acid or maleic anhydride b4) or alkenyl glycidyl ethers or vinyl glycidyl ethers b5).

Preferred compounds of the formulae I, II, III and IV are maleic acid and maleic anhydride as component b4) and esters of acrylic acid and/or methacrylic acid which contain epoxy groups, glycidyl acrylate and glycidyl methacrylate (as component b5)) being particularly preferred.

The amount of components b4) and b5) is, in each case, from 0.07 to 40, in particular from 0.1 to 20, particularly preferably from 0.15 to 15, % by weight, based on the total weight of the olefin polymers.

Olefin polymers of
from 50 to 98.9, in particular from 60 to 95, % by weight of ethylene,
from 0.1 to 20, in particular from 0.15 to 15, % by weight of glycidyl acrylate and/or glycidyl methacrylate, acrylic acid and/or maleic anhydride, and
from 1 to 45, in particular from 10 to 35, % by weight of n-butyl acrylate and/or 2-ethylhexyl acrylate
are particularly preferred.

Other preferred esters of acrylic and/or methacrylic acid are the methyl, ethyl, propyl and isobutyl esters.

The preparation of the ethylene copolymers described above can be carried out by conventional methods, preferably by random copolymerization under high pressure and at elevated temperatures.

The melt flow index of the ethylene copolymers is in general from 1 to 80 g/10 min (measured at 190° C. and under a load of 2.16 kg).

In addition to the above preferred elastomeric polymers based on olefins, for example, the following polymers are suitable elastomers (B):

Primary examples of these are emulsion polymers whose preparation is described in, for example, Houben-Weyl, Methoden der organischen Chemie, Volume XII. I (1961), and by Blackley in the monograph Emulsion Polymerization.

In principle, random elastomers or elastomers having a shell structure may be used. The shell structure is determined by the order of addition of the individual monomers.

Examples of monomers for the preparation of the rubber part of the elastomers are acrylates, such as n-butyl acrylate and 2-ethylhexyl acrylate, corresponding methacrylates, butadiene and isoprene, as well as mixtures thereof. These monomers can be copolymerized with further monomers, such as styrene, acrylonitrile, vinyl ethers and further acrylates or methacrylates, e.g. methyl methacrylate, methyl acrylate, ethyl acrylate and propyl acrylate.

The flexible or rubber phase (having a glass transition temperature of less than 0° C.) of the elastomers may constitute the core, the outer shell or a middle shell (in the case of elastomers having a structure comprising more than two shells); in the case of multishell elastomers, a plurality of shells may consist of one rubber phase.

If, in addition to the rubber phase, one or more rigid components (having glass transition temperatures of more than 20° C.) are involved in the structure of the elastomer, they are generally prepared by polymerization of styrene, acrylonitrile, methacrylonitrile, α-methylstyrene, p-methylstyrene, acrylates and methacrylates, such as methyl acrylate, ethyl acrylate and methyl methacrylate, as main monomers. Relatively small amounts of further comonomers may be used here too.

In some cases, it has proven advantageous to use emulsion polymers which have reactive groups at the surface. Such groups are, for example, epoxy, carboxyl, latent carboxyl, amino or amido groups and functional groups which can be introduced by the use of monomers of the general formula $$CH_2=C-X-N-C-R^{12}$$
$$\phantom{CH_2=}\overset{|}{R^{10}}\phantom{-X-}\overset{|}{R^{11}}\overset{\|}{\phantom{-}}\overset{}{O}$$

where
$R^{10}$ is hydrogen or $C_1$-$C_4$-alkyl,
$R^{11}$ is hydrogen, $C_1$-$C_8$-alkyl or aryl, in particular phenyl,
$R^{12}$ is hydrogen, $C_1$-$C_{10}$-alkyl, $C_8$-$C_{12}$-aryl or $OR^{13}$ and
$R^{13}$ is a $C_1$-$C_8$-alkyl or $C_8$-$C_{12}$-aryl group which may be substituted by O- or N-containing groups, or $R^{13}$ is a chemical bond, $C_1$-$C_{10}$-alkylene or $C_6$-$C_{12}$-arylene or $$-\overset{\overset{\displaystyle O}{\|}}{C}-Y$$

Y is O—Z or NH—Z and
Z is $C_1$-$C_{10}$-alkylene or $C_6$-$C_{12}$-arylene.

The graft monomers described in EP-A 208 187 are also suitable for the introduction of reactive groups at the surface.

Further examples are acrylamide, methacrylamide and substituted esters of acrylic acid or methacrylic acid, such as (N-tert-butylamino)-ethyl methacrylate, (N,N-dimethylamino)-ethyl acrylate, (N,N-dimethylamino)-methyl acrylate and (N,N-diethylamino)-ethyl acrylate.

Furthermore, the particles of the rubber phase may also be crosslinked. Examples of monomers which act as crosslinking agents are buta-1,3-diene, divinylbenzene, diallyl phthalate and dihydrodicyclopentadienyl acrylate and the compounds described in EP-A 50 265.

Graft-linking monomers may also be used, i.e. monomers having two or more polymerizable double bonds which react at different rates during the polymerization. Preferably used compounds are those in which one or more double bonds polymerize at about the same rate as the other monomers while the remaining double bonds polymerize substantially more slowly. The different polymerization rates result in a certain proportion of unsaturated double bonds in the rubber. If a further phase is then grafted onto such a rubber, some or all of the double bonds present in the rubber react with the graft monomers with formation of chemical bonds, i.e. the grafted-on phase is partly or completely linked to the grafting base via chemical bonds.

Examples of such graft-linking monomers are allyl-containing monomers, in particular allyl esters of ethylenically unsaturated carboxylic acids, such as allyl acrylate, allyl methacrylate, diallyl maleate, diallyl fumarate, diallyl itaconate, or the corresponding monoallyl compounds of these dicarboxylic acids. There is also a large number of further suitable graft-linking monomers; for further details, reference may be made to, for example, U.S. Pat. No. 4,148,846.

In general, the amount of these crosslinking monomers in component (B) is not more than 5, preferably not more than 3, % by weight, based on (B).

Some preferred emulsion polymers are mentioned below.

Graft polymers having a core and one or more outer shells may primarily be mentioned here and have the following compositions:

| Type | Monomers for the core | Monomers for the shell |
|---|---|---|
| B/1 | buta-1,3-diene, isoprene, n-butyl acrylate, ethylhexyl acrylate or mixtures thereof | styrene, acrylonitrile, methyl methacrylate |
| B/2 | as for B/1 but with the use of crosslinking agents | as for B/1 |
| B/3 | as for B/1 or B/2 | n-butyl acrylate, ethyl acrylate, methyl acrylate, buta-1,3-diene, isoprene ethylhexyl acrylate |
| B/4 | as for B/1 or B/2 | as for B/1 or B/3 but with the use of monomers having reactive groups as described herein |
| B/5 | styrene, acrylonitrile, methyl methacrylate or mixtures thereof | first shell of monomers as described under B/1 and B/2 for the core second shell as described under B/1 or B/3 for the shell |

Instead of graft polymers having a multishell structure, it is also possible to use homogeneous, i.e. one-shell, elastomers of buta-1,3-diene, isoprene and n-butyl acrylate or copolymers thereof. These products too can be prepared in the presence of crosslinking monomers or monomers having reactive groups.

Examples of preferred emulsion polymers are n-butyl acrylate/(meth)acrylic acid copolymers, n-butyl acrylate/glycidyl acrylate or n-butyl acrylate/glycidyl methacrylate copolymers, graft polymers having an inner core of n-butyl acrylate or based on butadiene and an outer shell of the abovementioned copolymers and copolymers of ethylene with comonomers which provide reactive groups.

The elastomers (B) described can also be prepared by other conventional methods, for example by suspension polymerization.

In addition to the essential components $A_1$) to $A_3$) and, if required, B), the novel molding materials may contain conventional additives and processing assistants (C). The amount of these is in general not more than 10, preferably not more than 5, % by weight, based on the total weight of components ($A_1$) to ($A_3$).

Examples of conventional additives are stabilizers and antioxidants, heat stabilizers and ultraviolet stabilizers, dyes, pigments and plasticizers.

Antioxidants and heat stabilizers which can be added to the thermoplastic materials according to the invention are, for example, halides of metals of group I of the Periodic Table, for example sodium, potassium and lithium halides, if necessary in combination with copper(I) halides, e.g. chlorides, bromides or iodides. Zinc fluoride and zinc chloride may also be used. Sterically hindered phenols, hydroquinones, substituted men%-bets of this group and mixtures of these compounds can also be used, preferably in concentrations of not more than 1% by weight, based on the weight of the mixture.

Examples of UV stabilizers are various substituted resorcinols, salicylates, benzotriazoles and benzophenones, which are used in general in amounts of not more than 2% by weight.

The novel thermoplastic molding materials can be prepared by conventional methods, by mixing the starting components in conventional mixing apparatuses, such as screw extruders, Brabender mills or Banbury mills, and then extruding the mixture. After extrusion, the extrudate is cooled and comminuted.

The novel molding materials possess good flow and UV stability.

In addition, they have good flame resistance and can readily be prepared by conventional methods.

Because of this property spectrum, the moldings which may be produced from the novel molding materials are particularly suitable for electrical and electronic components, for example electric motor parts (motor protection switches, power contactors), electric heaters or housing parts for high voltage switches. The novel molding materials are particularly suitable for the production of moldings having thin walls and long flow distances, such as cable binders which are used in the electrical sector.

EXAMPLES

Examples 1 to 9

Nylon 66 (PA1; Ultramid ®A3 from BASF AG) having a viscosity number of 151 ml/g (measured in a 0.5% strength by weight solution in 96% strength by weight $H_2SO_4$ according to ISO 307 at 25° C.) was compounded with Ai(OH)a and esters and amides in different ratios in a ZSK 30 twin-screw extruder from Werner & Pfleiderer (280° C. at 250 rpm and a throughput of 25 kg/h). The products were extruded and the extrudates granulated. The ester used was pentaerythrityl distearate (abbreviated to Stab.) (Stabiol ® CA 1362 from Henkel KGaA) and the amide used was the distearate of ethylenediamine (abbreviated to EAST) (Synthewax® from Henkel KGaA) and the Ai(OH)₃ used was Martinal® OL-104 from Martinswerke.

Comparative Experiments I to V

The procedure was as in Examples 1 to 9, but without any addition (II) or without addition of Ai(OH)s (I, III, IV, V). Comparative Example V contained aluminum tristearate (AlSt) (Alugel® 34TH from Bärlocher GmbH).

Comparative Experiments VI to XII

The procedure was as in Examples 1 to 9, but various hydroxides, oxides or carbonates were added to a constant amount of Stabiol®.

Example 10

The procedure was as in Examples 1 to 9, except that nylon 66 (PA2; Ultramid® A4 from BASF AG) having a viscosity number of 186 ml/g was used.

After drying of the granules (8 hours at 80° C. under reduced pressure), test specimens were produced on an injection molding machine (melt temperature: 280° C., mold surface temperature: 80° C.) and the following tests were carried out.

Modulus of elasticity according to DIN 54,457
Tensile strength according to DIN 54,455
Total penetration energy $W_{tot}$ according to DIN 53,443
UL 94 on 0.8/1.6/3.2 mm thick flat bars
Melt volume index MVI at 275° C. and under a load of 2.16 kg
VN (viscosity number) according to ISO 307 (96% strength by weight $H_2SO_4$)
Shortest possible cycle time in a test mold (vacuum cleaner cover) under constant conditions: melt temperature 290° C., mold surface temperature 62° C., injection pressure 500 bar The composition of the molding materials and the results of the measurements are shown in the Tables.

TABLE 1

| | | Composition | | | | |
|---|---|---|---|---|---|---|
| Example | % by weight $A_1$) | | % by weight $A_2$) | | % by weight $A_3$) | |
| I | 99.50 | PA1 | | | 0.5 | Stab |
| 1 | 99.45 | PA1 | 0.05 | Al(OH)₃ | 0.5 | Stab |
| 2 | 99.40 | PA1 | 0.10 | Al(OH)₃ | 0.5 | Stab |
| 3 | 99.35 | PA1 | 0.15 | Al(OH)₃ | 0.5 | Stab |
| 4 | 99.25 | PA1 | 0.25 | Al(OH)₃ | 0.5 | Stab |
| 5 | 99.00 | PA1 | 0.50 | Al(OH)₃ | 0.5 | Stab |
| 6 | 99.60 | PA1 | 0.15 | Al(OH)₃ | 0.3 | Stab |
| 7 | 98.85 | PA1 | 0.15 | Al(OH)₃ | 1.0 | Stab |
| 8 | 99.35 | PA1 | 0.15 | Al(OH)₃ | 0.5 | EASt |
| 9 | 09.85 | PA1 | 0.15 | Al(OH)₃ | 1.0 | EASt |
| II | 100.00 | PA1 | | | | |
| III | 99.00 | PA1 | | | 1.0 | Stab |
| IV | 99.00 | PA1 | | | 1.0 | EASt |
| V | 99.00 | PA1 | | | 1.0 | AlSt |
| VI | 99.35 | PA1 | 0.15 | Mg(OH)₂ | 0.5 | Stab |
| VII | 99.35 | PA1 | 0.15 | Al₂O₃ | 0.5 | Stab |
| VIII | 99.35 | PA1 | 0.15 | Ca(OH)₂ | 0.5 | Stab |
| IX | 99.35 | PA1 | 0.15 | Ca(CO)₃ | 0.5 | Stab |
| X | 99.35 | PA1 | 0.15 | SiO₂ | 0.5 | Stab |
| XI | 99.35 | PA1 | 0.15 | B₂O₃ | 0.5 | Stab |
| XII | 99.35 | PA1 | 0.15 | Sb₂O₃ | 0.5 | Stab |
| 10 | 98.85 | PA2 | 0.15 | AL(OH)₃ | 1.0 | Stab |
| XIII | 99.00 | PA2 | | | 1.0 | AlSt |
| XIV | 100.00 | PA2 | | | | |
| XV | 98.85 | PA2 | 0.15 | Al₂O₃ | 1.0 | Stab |

Comparative Examples XIII to XV

The procedure was similar to that of Example 10, but without lubricant (XIV) and other lubricants according to the Table.

TABLE 2

| Example | VN [ml/g] before compounding | VN [ml/g] after compounding | VN [ml/g] after injection molding | $W_{tot}$ [J/m] | MVI [10 min] | Cycle time [sec] | UL 94 3.2/1.6/ 0.8 mm |
|---|---|---|---|---|---|---|---|
| I | 151 | 148 | 148 | 111 | 142 | 29 | V-/V-/V- |
| 1 | 151 | 150 | 148 | 90 | 138 | 29 | V2/V-/V- |
| 2 | 151 | 148 | 150 | 95 | 150 | 28 | V2/V2/V2 |
| 3 | 151 | 146 | 145 | 87 | 152 | 29 | V2/V2/V2 |
| 4 | 151 | 150 | 146 | 90 | 145 | 27 | V2/V2/V2 |
| 5 | 151 | 146 | 148 | 65 | 144 | 28 | V2/V2/V2 |
| 6 | 151 | 150 | 152 | 98 | 140 | 34 | V2/V2/V- |
| 7 | 151 | 146 | 146 | 110 | 152 | 28 | V2/V2/V2 |
| 8 | 151 | 151 | 153 | 103 | 148 | 29 | V2/V2/V2 |
| 9 | 151 | 150 | 153 | 110 | 155 | 28 | V2/V2/V2 |
| II | 151 | 153 | 148 | 95 | 122 | 40 | V2/V-/V- |
| III | 151 | 147 | 144 | 102 | 144 | 28 | V-/V-/V- |
| IV | 151 | 150 | 148 | 92 | 148 | 29 | V-/V-/V- |
| V | 151 | 140 | 138 | 100 | 150 | 29 | V2/V2/V2 |
| VI | 151 | 144 | 142 | 90 | 144 | 30 | V-/V-/V- |
| VII | 151 | 150 | 152 | 87 | 140 | 28 | V-/V-/V- |

TABLE 2-continued

| Example | VN [ml/g] before compounding | VN [ml/g] after compounding | VN [ml/g] after injection molding | $W_{tot}$ [J/m] | MVI [10 min] | Cycle time [sec] | UL 94 3.2/1.6/ 0.8 mm |
|---|---|---|---|---|---|---|---|
| VIII | 151 | 140 | 138 | 82 | 151 | 28 | V-/V-/V- |
| IX | 151 | 148 | 148 | 96 | 140 | 29 | V-/V-/V- |
| X | 151 | 150 | 149 | 85 | 149 | 27 | V-/V-/V- |
| XI | 151 | 145 | 149 | 102 | 152 | 28 | V-/V-/V- |
| XII | 151 | 148 | 145 | 86 | 147 | 28 | V-/V-/V- |
| 10 | 186 | 178 | 177 | n.g. | 59 | 38 | V2/V2/V2 |
| XIII | 186 | 165 | 156 | 120 | 88 | 33 | V2/V2/V2 |
| XIV | 186 | 180 | 178 | n.g. | 48 | 49 | V2/V-/V- |
| XV | 186 | 180 | 176 | n.g. | 61 | 37 | V-/V-V- |

We claim:

1. An unreinforced polyamide molding material, consisting essentially of
   A) from 60 to 100% by weight of a mixture consisting of
      $A_1$) from 97.5 to 99.85% by weight of one or more polyamides,
      $A_2$) from 0.05 to 0.5% by weight of aluminum hydroxide and
      $A_3$) from 0.1 to 2% by weight of one or more esters or amides of saturated or unsaturated aliphatic carboxylic acids of 10 to 40 carbon atoms with aliphatic saturated alcohols or a/nines of 2 to 40 carbon atoms
   and, based on the total weight of the polyamide molding material,
   B) from 0 to 40% by weight of an elastomeric polymer.

2. An unreinforced polyamide molding material as claimed in claim 1, wherein component A) consists essentially of
   from 98.1 to 99.6% by weight of $A_1$),
   from 0.1 to 0.4% by weight of $A_2$) and
   from 0.3 to 1.5% by weight of $A_3$).

3. An unreinforced polyamide molding material as claimed in claim 1, consisting essentially of
   from 80 to 90% by weight of A) and
   from 10 to 20% by weight of B).

4. An unreinforced polyamide molding material as claimed in claim 1, wherein component $A_1$) consists of polyhexamethyleneadipamide or poly-ε-caprolactam or a mixture thereof.

5. An unreinforced polyamide molding material as claimed in claim 1, wherein component $A_1$) is a partly aromatic semicrystalline copolyamide consisting essentially of:
   $A_{11}$) from 20 to 90% by weight of units derived from terephthalic acid and hexamethylenediamine,
   $A_{22}$) from 0 to 50% by weight of units derived from ε-caprolactam,
   $A_{33}$) from 0 to 80% by weight of units derived from adipic acid and hexamethylenediamine, and
   $A_{44}$) from 0 to 40% by weight of other polyamide-forming monomers,
the amounts of components ($A_{22}$) or ($A_{33}$) or ($A_{44}$) or mixtures thereof being not less than 10% by weight.

6. An unreinforced polyamide molding material as claimed in claim 1, wherein component $A_3$) consists of pentaerythrityl distearate or ethylenediamine distearate or a mixture thereof.

7. A molding obtained from an unreinforced polyamide molding material as claimed in claim 1.

* * * * *

UNITED STATES PATENT AND TRADEMARK OFFICE
CERTIFICATE OF CORRECTION

PATENT NO.: 5,332,777

DATED: July 26, 1994

INVENTOR(S): GOETZ et al.

It is certified that error appears in the above-identified patent and that said Letters Patent is hereby corrected as shown below:

Column 13, claim 1, line 26, "a/nines" should read --amines--.

Signed and Sealed this

First Day of November, 1994

Attest:

BRUCE LEHMAN

Attesting Officer

Commissioner of Patents and Trademarks